(12) United States Patent
Collard

(10) Patent No.: US 12,143,539 B2
(45) Date of Patent: *Nov. 12, 2024

(54) DYNAMIC COMMUNICATION MANAGEMENT SYSTEM

(71) Applicant: CALLFIRE, INC., Santa Monica, CA (US)

(72) Inventor: Michael H. Collard, Glendale, CA (US)

(73) Assignee: CALLFIRE, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,709

(22) Filed: Aug. 23, 2021

(65) Prior Publication Data
US 2022/0086283 A1    Mar. 17, 2022

Related U.S. Application Data

(63) Continuation of application No. 16/355,548, filed on Mar. 15, 2019, now Pat. No. 11,102,355.

(60) Provisional application No. 62/646,749, filed on Mar. 22, 2018.

(51) Int. Cl.
*H04M 7/12*    (2006.01)
*H04M 3/42*    (2006.01)
*H04M 3/533*   (2006.01)
*H04W 4/00*    (2018.01)
(Continued)

(52) U.S. Cl.
CPC ....... *H04M 7/128* (2013.01); *H04M 3/42348* (2013.01); *H04M 3/42382* (2013.01); *H04M 3/53341* (2013.01); *H04W 4/14* (2013.01); *H04W 40/20* (2013.01)

(58) Field of Classification Search
CPC .......... H04M 3/42357; H04M 3/5175; H04M 15/08; H04M 15/72; H04M 15/755; H04M 15/8214; H04M 3/367; H04M 3/42161; H04M 3/42306; H04M 3/42059; H04M 3/5158; H04M 3/42042; H04M 3/5183; H04M 3/42008; H04M 3/51; H04M 3/5166; H04M 3/5233; H04M 1/2535; H04M 1/57; H04M 7/0093; H04M 2203/407; H04M 2207/12; H04M 2215/62; H04M 7/0075; H04M 15/8221; H04L 65/1069; H04L 65/1006; H04L 65/1083; H04W 4/14; H04W 4/16; H04W 4/02; H04W 40/02; H04W 4/029; H04W 12/02; H04W 4/50;
(Continued)

(56) References Cited

U.S. PATENT DOCUMENTS 5,901,209 A    5/1999  Tannenbaum et al.
8,135,122 B1   3/2012  Siminoff
(Continued)

*Primary Examiner* — Kharye Pope
(74) *Attorney, Agent, or Firm* — Knobbe, Martens, Olson & Bear, LLP

(57) ABSTRACT

A dynamic communication management system manages the exchange of phone-based communications between devices using dynamically determined routing data. The routing for the phone-based communications can be dynamically determined such that certain identifying information is provided to destination devices instead of the identifying information that would be provided without the services of the dynamic communication management system.

20 Claims, 6 Drawing Sheets

(51) Int. Cl.
*H04W 4/14* (2009.01)
*H04W 40/20* (2009.01)

(58) Field of Classification Search
CPC ..... H04W 48/04; H04W 64/00; H04W 76/11; G06F 16/9537; G06F 16/29; G06F 16/487
USPC ........... 455/415, 456.1, 456.3, 466; 370/352, 370/259
See application file for complete search history.

(56) References Cited

U.S. PATENT DOCUMENTS

| | | | | |
|---|---|---|---|---|
| 8,280,022 B1* | 10/2012 | Trinidad | ........... | H04M 3/42042 |
| | | | | 379/201.01 |
| 8,693,655 B1* | 4/2014 | Chau | ..................... | H04M 17/10 |
| | | | | 379/201.11 |
| 9,338,289 B1* | 5/2016 | Goyal | ............... | H04M 3/42042 |
| 9,398,148 B1* | 7/2016 | Neuer, III | ............... | H04M 3/5158 |
| 9,420,103 B1* | 8/2016 | Varman | ............... | H04M 3/5235 |
| 9,531,877 B1* | 12/2016 | Ouimette | ........... | H04M 3/5158 |
| 10,182,034 B1* | 1/2019 | Koster | ............. | H04M 3/42059 |
| 2003/0147519 A1 | 8/2003 | Jain et al. | | |
| 2003/0174825 A1 | 9/2003 | Aldrige et al. | | |
| 2004/0101123 A1* | 5/2004 | Garcia | ............. | H04M 3/42008 |
| | | | | 379/220.01 |
| 2004/0266415 A1 | 12/2004 | Belkin et al. | | |
| 2005/0084079 A1 | 4/2005 | Lang | | |
| 2006/0268750 A1* | 11/2006 | Weiner | ............... | H04L 65/4061 |
| | | | | 370/260 |
| 2007/0100710 A1* | 5/2007 | Singh | ................. | G06Q 30/0601 |
| | | | | 705/26.1 |
| 2008/0075259 A1* | 3/2008 | Trevallyn-Jones | ..... | H04L 61/00 |
| | | | | 379/211.02 |
| 2008/0198987 A1* | 8/2008 | Daly | ....................... | H04M 3/54 |
| | | | | 379/211.01 |
| 2009/0253420 A1 | 10/2009 | Stewart et al. | | |
| 2010/0325229 A1 | 12/2010 | Kelley | | |
| 2012/0189111 A1* | 7/2012 | Siminoff | ........... | H04M 3/42059 |
| | | | | 379/201.01 |
| 2015/0269697 A1* | 9/2015 | Rivera de la Vega | .. | H04W 4/12 |
| | | | | 705/2 |
| 2017/0064525 A1 | 3/2017 | Ben Arzi et al. | | |
| 2018/0131799 A1 | 5/2018 | Kashimba et al. | | |
| 2020/0175545 A1 | 6/2020 | Handrigan | ........ | G06Q 30/0277 |

* cited by examiner

DYNAMIC COMMUNICATION MANAGEMENT SYSTEM

CROSS-REFERENCE TO RELATED APPLICATIONS

The present application is a continuation of U.S. patent application Ser. No. 16/355,548, filed on Mar. 15, 2019, which claims priority to U.S. Provisional Patent Application No. 62/646,749, filed on Mar. 22, 2018, the entire contents of both of which are incorporated by reference herein and made part of this specification.

BACKGROUND

Electronic devices may be used to exchange information over communication networks. For example, in addition to exchanging voice-based communications, a mobile phone may be used to generate a text message (also referred to as a short message service message or "SMS" message). The mobile phone may send the voice-based communication or text message to another mobile phone over the public switched telephone network ("PSTN"). A user of the other mobile phone can hear the voice-based communication or view the text message and respond, if desired. Some mobile phones are configured to send and/or receive images, video, and other media information in addition to voice-based communications and text messages. For example, some mobile phones may generate and transmit multimedia messaging service ("MMS") messages to other mobile devices.

In a common implementation, a mobile phone that receives a communication (also referred to as the destination device) is configured to present identifying information regarding the sender of the communication. For example, the destination device may receive, with the communication, information such as the phone number of the mobile phone from which the communication originated (also referred to as the originating device). The destination device may then present a caller identification, or "caller ID," in connection with the received communication. In some implementations, transmission of caller ID data to the receiving device may include the transmission of a name of a person or entity associated with the calling telephone number.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
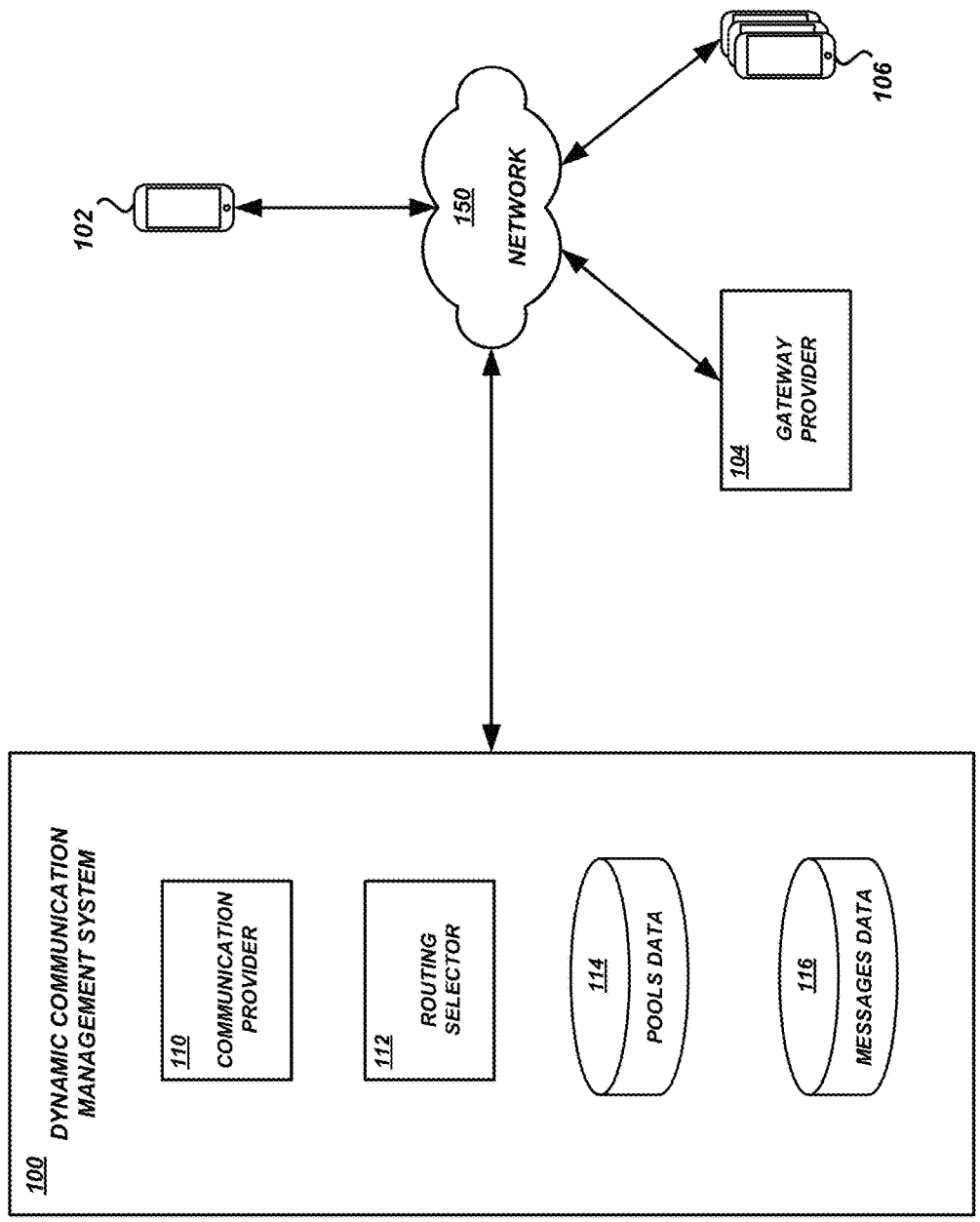
FIG. 1 is a block diagram of an illustrative computing environment including a dynamic communication management system, various user devices, and various gateways according to some embodiments.

The present disclosure is directed to a dynamic communication management system that manages the exchange of phone-based communications between devices using dynamically-determined routing data. The routing for the phone-based communications can be dynamically determined such that certain identifying information is provided to destination devices instead of the identifying information that would be provided without the services of the dynamic communication management system.

A device (e.g., an originating device) may initiate transmission of phone-based communications, such as voice calls, short message service or "SMS" messages, multimedia message server or "MMS" messages, etc. Conventional phone-based communication systems transmit identifying information—in addition to the phone-based communications—to destination devices. The identifying information may include information that identifies originating devices, accounts associated with the originating devices, intermediary systems that send or forward communications on behalf of the originating devices, and the like. Illustratively, an originating device or intermediary system may send multiple phone-based communications (e.g., SMS messages) to various destination devices. Each destination device may receive a phone-based communication, and also the identifying information that corresponds to the originating device or intermediary system that sent the communication on behalf of the originating device. For example, the phone number and/or a name associated with the originating device may be provided to the destination device. The destination device may then present the identifying information (or information derived therefrom) when the phone-based communication is received, thereby aiding a user of the destination device in determining the source of the phone-based communication.

Aspects of the present disclosure relate to the dynamic determination of routing data for phone-based communications, and use of the dynamically determined routing data to transmit the phone-based communications to destination devices on behalf of originating devices. A dynamic communication management system can dynamically determine the routing for individual phone-based communications (or collections thereof) such that desired identifying information regarding the source of an individual phone-based communication is provided to the destination device. Illustratively, the routing is determined such that the identifying information (e.g., the phone number of the "sender") that is provided to the destination device may be different than the identifying information that would be provided if the phone-based communication were sent from the originating device without using dynamically determined routing. The routing for a phone-based communication may be dynamically determined based on various criteria, and may be the same or different for different originating devices, destination devices, communications, etc.

Additional aspects of the present disclosure relate to methods of determining and using various criteria to dynamically determine routing for phone-based communications. In some embodiments, a geographic location associated with a destination device may be determined. For example, the country in which the phone number of a particular destination device is registered may be determined through an analysis of the phone number and/or other information associated with the destination device. Based at least in part on the determined country, a phone number may be selected for routing a phone-based communication to the destination device. The dynamic communication management system can use a phone number that is associated with the same country as the destination device, and transmit the message using the dynamically-determined phone number. In this way, identification information that is provided with the phone-based communication to the destination device can identify the phone-based communication as originating from (or otherwise being associated with) the same country as the destination device. In some embodiments, a prefix or other portion of a phone number of the destination device may be identified. Based at least in part on the identified prefix (or other portion), a phone number may be selected for routing a phone-based communication to the destination device. For example, the dynamic communication management system can use a phone number that includes or is otherwise associated with the identified prefix, and transmit the message using the dynamically-determined phone number. In this way, identification information that is provided with the phone-based communication to the destination device can identify the phone-based communication as originating from a device having a phone number with the same prefix as the phone number of the destination device. In some embodiments, other methods may be used to dynamically determine a phone number to use when transmitting a phone-based communication. For example, a phone number may be selected from a pool of available phone numbers using a pseudo-random selection process.

Although aspects of some embodiments described in the disclosure will focus, for the purpose of illustration, on particular examples of phone-based communications and routing selection methods, the examples are illustrative only and are not intended to be limiting. In some embodiments, the techniques described herein may be applied to additional or alternative phone-based communication methods and routing selection methods. Various aspects of the disclosure will now be described with regard to certain examples and embodiments, which are intended to illustrate but not limit the disclosure.

Phone-Based Communication Environment

With reference to an illustrative embodiment, FIG. 1 shows a network environment in which aspects of the present disclosure may be implemented. As shown, the network environment may include a dynamic communication management system 100, various communication devices 102, 106, and various gateway providers 104. The communication devices 102, 106 may also be collectively referred to as end-user devices, or more simply as user devices. User device 102 may also be referred to as an originating device, and the user devices 106 may also be referred to as destination devices. The communication management system 100, the user devices 102, 106, and the gateway providers 104 may communicate with each other via one or more communication networks 150.

In some embodiments, the communication network 150 may be a circuit-switched network or other telephone network. For example, communication network 150 may be a publicly-accessible telephone network, such as the public switched telephone network ("PSTN"). In some cases, the communication network 150 may be or include a private telephone network, such as a private branch exchange ("PBX"). In some embodiments, communication network 150 may be or include a packet-switched data network. Illustratively, communication network 150 may include a publicly-accessible network of linked networks, possibly operated by various distinct parties, such as the Internet. In some cases, the network 150 may include a private network, personal area network, local area network, wide area network, cable network, satellite network, cellular data network, etc., or a combination thereof, some or all of which may or may not have access to and/or from the Internet.

The dynamic communication management system 100 may include various components for providing the features described herein. Illustratively, the dynamic communication management system 100 may include a pools data store 114 for storing data regarding pools of routing data (e.g., phone numbers) available for use in routing phone-based communications, and a messages data store 116 for storing data regarding recently-transmitted phone-based communications or ongoing conversations (e.g., which phone numbers from the pools data store 114 have been used to transmit phone-based communications to external phone numbers, etc.). The dynamic communication management system 100 may also include a communication provider 110 that manages the receipt of communication transmission requests, and the transmission of the requested communications. The dynamic communication management system 100 may also include a routing selector 112 that handles dynamic selection of routing for individual phone-based communications (or groups thereof). The example components and data stores of the dynamic communication management system 100 shown in FIG. 1 are illustrative only, and are not intended to be limiting. In some embodiments, a dynamic communication management system 100 may have fewer, additional, and/or alternative components and data stores.

The dynamic communication management system 100 may be implemented on one or more physical server computing devices that provide computing services and resources to user devices 102, 106. In some embodiments, the dynamic communication management system 100 (or individual components thereof, such as the communication provider 110, routing selector 112, etc.) may be implemented on one or more host devices, such as blade servers, midrange computing devices, mainframe computers, desktop computers, or any other computing device configured to provide computing services and resources. For example, a single host device may execute one or more communication providers 110, routing selectors 112, etc. The communication management system 100 may include any number of such hosts.

In some embodiments, the features and services provided by the dynamic communication management system 100 may be implemented as web services consumable via one or more communication networks. In further embodiments, the dynamic communication management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual user devices 102, 106 may be any of a wide variety of electronic communication devices, including mobile devices (e.g., cellular and other mobile phones, smart phones, media players, handheld gaming devices, etc.), personal computing devices, terminal computing devices, laptop computing devices, tablet computing devices, electronic reader devices, wearable computing devices, and various other electronic devices and appliances. In some embodiments, the user devices 102, 106 are devices configured to send/receive text or media messages over a phone network. Such messages may be referred to as "phone-based communications" or "phone-based messages." For example, a user device 102 may be configured with application software that provides SMS message functionality to send text messages to other devices that also provide SMS message functionality. Although the user devices 102 and user devices 106 are referred to separately herein, in some embodiments the user devices 102 and 106 may be the same type of device or may provide some or all of the same functionality as each other.

Figure 2:
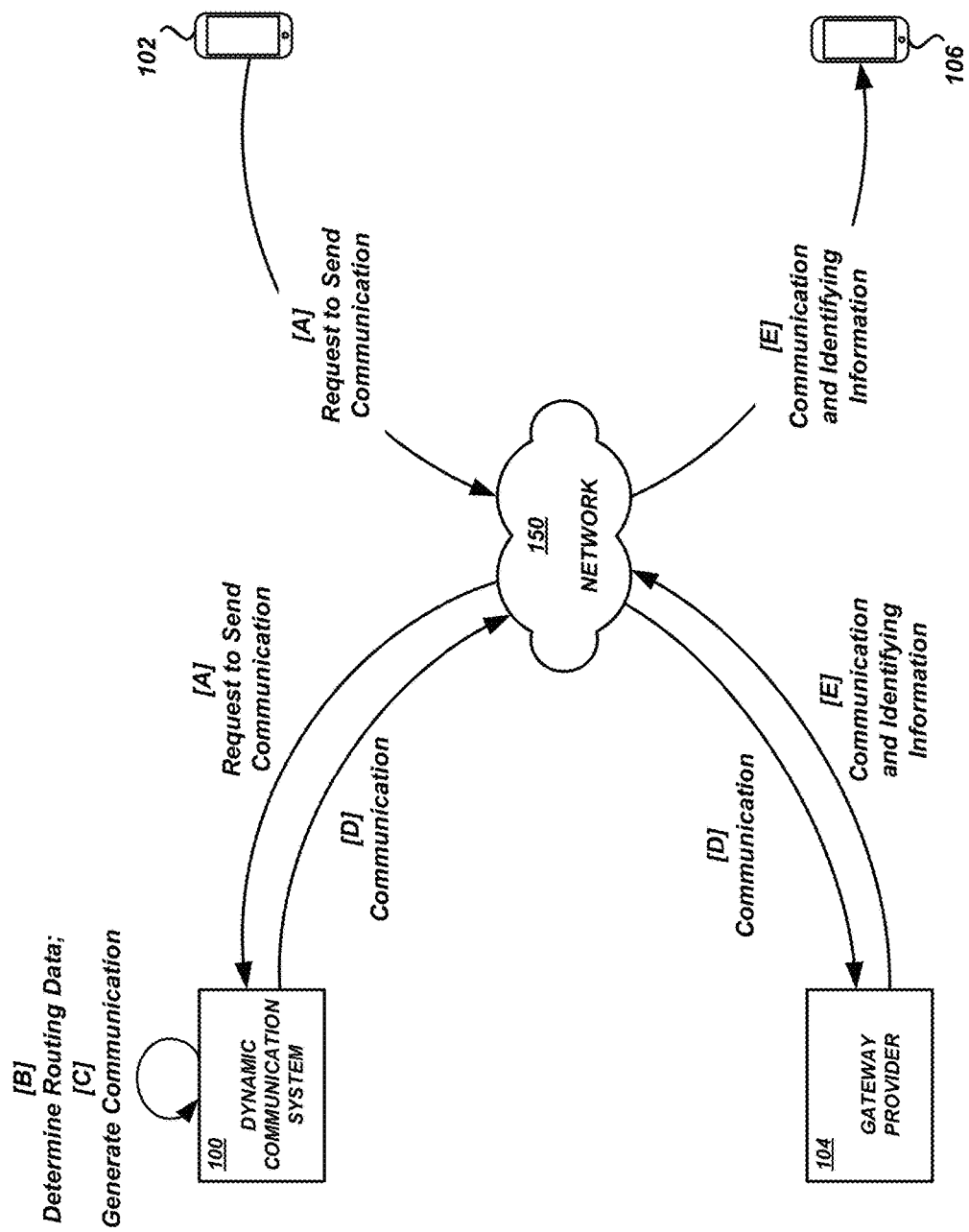
FIG. 2 is a block diagram of various data flows and interactions between a dynamic communication management system, an originating device, a gateway provider, and a destination device according to some embodiments.

FIG. 2 shows example data flows and interactions between the dynamic communication management system 100, an originating device 102, a gateway provider 104, a destination device 106, and a network 150 in connection with the transmission of a phone-based communication to the destination device 106 on behalf of the originating device 102.

At [A], an originating device 102 can request transmission of one or more phone-based communications to destination devices, including destination device 106. In some embodiments, the originating device 102 may provide a listing of destination device phone numbers, a reference to a predetermined set of destination device phone numbers, the content of the phone-based communication to be sent to individual destination devices 106 or all destination devices, other data, or some combination thereof. The originating device 102 may indicate (before or in connection with the request at [A]) a pool of routing data to be used when transmitting the phone-based communications. For example, pools data store 114 may store a plurality of different pools of routing data. The originating device 102 may transmit an identifier of a particular pool of routing data to be used. The identified pool may be, include, or otherwise be associated with one or more phone numbers to be used when transmitting phone-based communications. In some embodiments, the pool may also be associated with a selection method to be used by the routing selector 112, as described in greater detail below. In some embodiments, the originating device 102 may specify, as part of the request, the particular selection method to be used by the routing selector 112.

At [B], the dynamic communication management system 100 can dynamically determine the routing data for use in transmitting a phone-based communication to one or more destination devices, such as destination device 106. In some embodiments, the dynamic management system 100 can access data regarding the pool of routing data (e.g., phone numbers) associated with the request from the pools data store 114. Illustratively, a pool of phone numbers may be specified by data representing some or all of the following:

TABLE 1

| Data Category | Example Data |
|---|---|
| Pool Name or ID | <pool name or ID> |
| Selection Method | <name, ID, or pointer to selection method> |
| Phone Numbers | <phone number 1>, . . . , <phone number n> |
| Default Number | <default phone number> |
| Pool Owner | <pool owner ID> |

In an example using the pool data shown in Table 1, the routing selector 112 can use the indicated selection method to select one of the phone numbers from the list of phone numbers associated with the pool. Illustratively, the indicated selection method may be a selection method for using a phone number from the same country (or other type of geographic region) as the phone number of the destination device 106 to which the phone-based communication is to be sent. In this case, the routing selector 112 may use the method shown in FIG. 3A and described in greater detail below. As another example, the indicated selection method may be a selection method for using a phone number with the same prefix (e.g., the first 3 or 6 digits in NPA-NXX-XXXX formatted phone numbers) as the phone number of the destination device 106 to which the phone-based communication is to be sent. In this case, the routing selector 112 may use the method shown in FIG. 3B and described in greater detail below.

At [C], the dynamic communication management system 100 can generate the requested phone-based communication for transmission to the destination device 106. For example, the phone-based communication may be a text message (e.g., an SMS message) addressed to a phone number determined from the pool of routing data, as described above and in greater detail below. Illustratively, the phone number of the destination device 104 may be 555-555-5551, the dynamically determined phone number used to route the message may be 555-555-5552, and the contents of the message may be "Reminder that your dentist appointment is on Friday at 10:00 AM." The dynamically determined phone number may be referred to as a "source phone number" because, to the recipient of the phone-based message, the dynamically determined phone number will appear to be associated with the source of the message, even though the message (or the request to send the message) may have originated from a separate originating device that may be associated with a different originating phone number (or no phone number). In this example, the dynamically determined phone number (555-555-5552) used to route the communication to the destination device 106 may also serve as a "callback" number for a reply to the communication. In this example, the contents of the message may be sent and received according to a standard (e.g., plain text data) specified by a phone service or other provider of SMS services, such as the gateway provider 104 or some other entity. For example, the contents of the message may be generated as plain text data using the GSM 03.38 7-bit alphabet, the ASCII standard, etc. In some embodiments, the contents may be generated as other data, such as formatted text, images, video, sound, encrypted data, otherwise encoded information, etc.

At [D], the communication provider 110 or some other module or component of the dynamic communication management system 100 can send the phone-based communication to the destination device 106 using the dynamically-determined routing data. The dynamically-determined routing data may be a phone number associated with a particular operator or provider of telecommunication services on the network 150. For example, the dynamically determined routing data may be a phone number that is associated with a gateway provider 104 (e.g., the phone number was purchased or leased from the gateway provider 104). The communication provider 110 can provide the phone-based communication to the gateway provider 104, to be sent on to the destination device 106, using the dynamically determined phone number as the phone number of the sender (e.g., as a proxy for the originating device 102).

At [E], the gateway provider 104 can send the phone-based communication to the destination device 102, using the dynamically determined phone number as the phone number of the sender (e.g., as a proxy for the originating device 102).

Example Processes for Dynamic Routing Determination

Figure 3A:
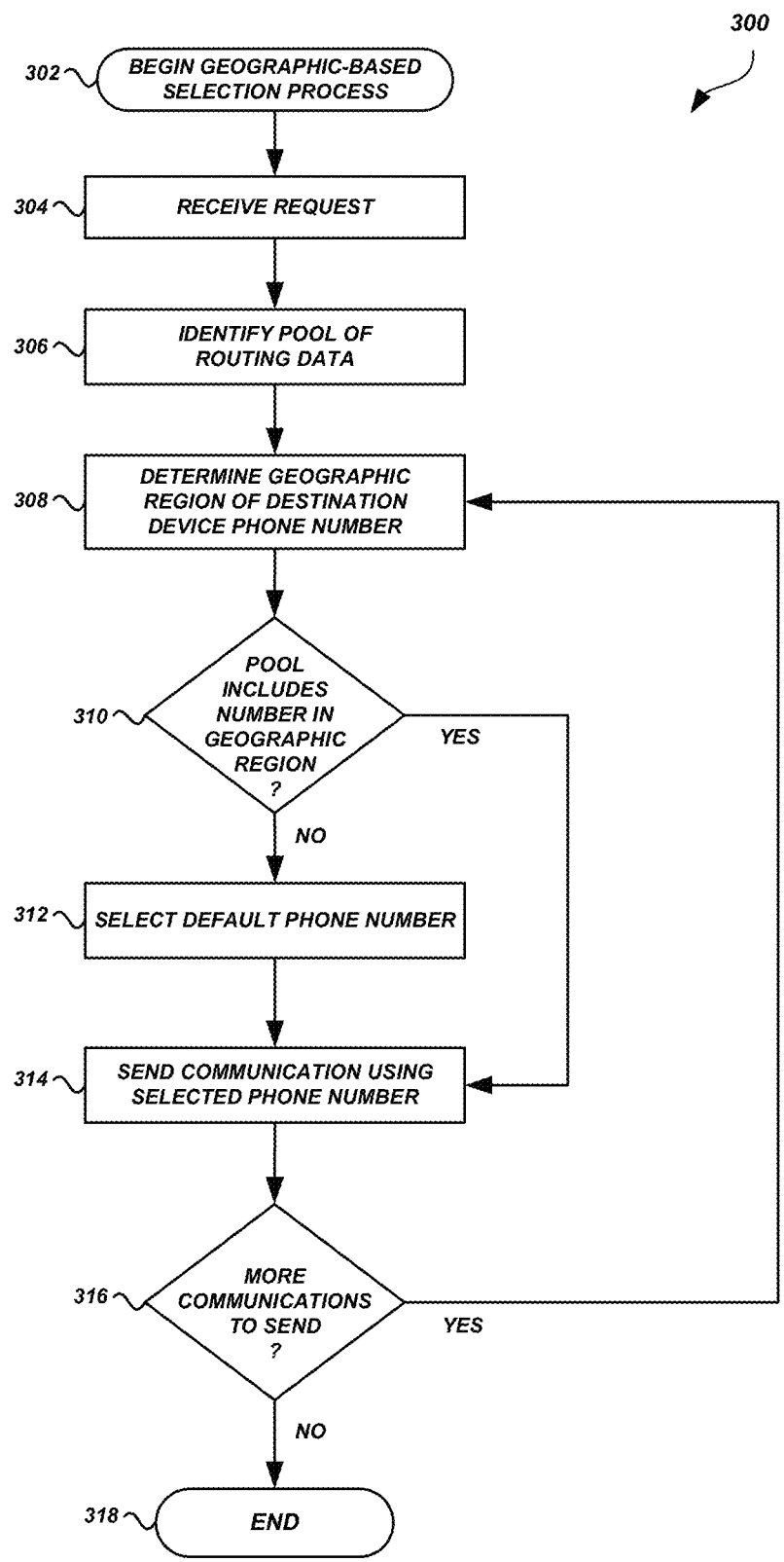
FIG. 3A is a flow diagram of an illustrative process for managing exchange of messages according to some embodiments.

FIG. 3A is a flow diagram of an illustrative process 300 that may be executed by a dynamic communication management system 100 to dynamically determine routing data based on a country or other geographic region associated with a destination device 106. Advantageously, the process 300 can dynamically select, for a given destination device phone number, a phone number associated with the same country (or other type of geographic region) to use in sending a phone-based communication to the destination device. In this way, the identifying data that the destination device 106 receives in connection with the phone-based communication will indicate that the communication originated from a device in or otherwise associated with the same geographic region. Thus, the communication may be more likely to be accepted and read, less likely to be blocked, etc.

The process 300 shown in FIG. 3A begins at block 302. When the process 300 is initiated, a set of executable program instructions stored on one or more non-transitory computer-readable media (e.g., hard drive, flash memory, removable media, etc.) may be loaded into memory (e.g., random access memory or "RAM") of a computing device of the dynamic communication management system 100, such as the computing device 500 shown in FIG. 5 and described in greater detail below. The executable instructions may then be executed by a hardware-based computer processor (e.g., a central processing unit or "CPU") of the computing device. In some embodiments, the process 300 or portions thereof may be implemented on multiple processors, serially or in parallel.

At block 304, the communication provider 110 or some other component or device of the dynamic communication management system 100 can receive a request to provide one or more phone-based communications to one or more destination devices 106. The request may be a request to send the phone-based communication immediately (or as soon as possible), or the request may be a request to send the phone-based communication as a one-time scheduled transmission, a recurring scheduled transmission, a transmission to be initiated in response to the occurrence of an event, etc.

In one specific, non-limiting embodiment, an originating device 102 may request that SMS-based appointment reminders be sent to devices associated with a set of destination device phone numbers. The reminders may all be sent at substantially the same time (e.g., as a batch process), or at different times. The contents of the reminders may be standardized (e.g., the same for all recipients) or customized (e.g., based on a template, or fully customized for each recipient). In another specific, non-limiting embodiment, an originating device 102 may request that voice-based communications be sent to devices associated with a set of destination device phone numbers. The voice-based communications may be recordings that are standardized for all recipients, or customized for individual recipients (e.g., dynamically generated from a template for individual recipients, or uniquely assigned to individual recipients). In some embodiments, the phone-based communications may be or include text broadcasts, voice broadcasts, chat-over-SMS sessions, polls or votes via SMS, other communications, some combination thereof, etc. The example phone-based communications described herein are illustratively only, and are not intended to be limiting. In some embodiments, the dynamic communication management system 100 may be configured to provide additional or alternative types of phone-based communications, provide the communications in response to additional or alternative types of events, etc.

At block 306, the communication provider 110 or some other component or device of the dynamic communication management system 100 can identify the pool of routing data to be used in sending the requested phone-based communication. Illustratively, the request may identify the pool of routing data, or the originating device 102 may be associated with a pool of routing data. As described above, the identified pool of routing data may include one or more phone numbers to be used in transmitting the phone-based communication(s).

At block 308, the routing selector 112 can determine the country (or other type of geographic region) associated with a phone number of a destination device 106 to which the phone-based communication is to be sent. In some embodiments, the routing selector 112 can determine the country based on an analysis of the phone number of the destination device 106. For example, the routing selector 112 may examine the first digit of the destination device phone number. In this example, the first digit of the destination device phone number indicates the "zone" to which the phone number belongs: Zone 1—North America; Zone 2—mostly Africa; Zones 3 and 4—Europe; Zone 5—Lower North America and Central America and South America; Zone 6—Southeast Asia and Oceania; Zone 7: Parts of the former Soviet Union; Zone 8—East Asia and special services; and Zone 9—mostly Asia. The routing selector 112 may then examine one or more digits following the initial digit to identify a particular country or other geographic location with the identified zone. Illustratively, if the first four digits are "1-310" then the routing selector 112 may determine that the destination phone number is associated with the United States (specifically, Los Angeles). If the first four digits are "1-876" then the routing selector 112 may determine that the destination phone number is associated with Jamaica. If the first two digits are "44" then the routing selector 112 may determine that the destination phone number is associated with the United Kingdom. If the first two digits are "49" then the routing selector 112 may determine that the destination phone number is associated with Germany.

At decision block 310, the routing selector 112 can determine whether the list of phone numbers in the current pool includes a phone number in the same country (or other type of geographic region) as the destination device phone number. For example, if the destination device phone number is associated with Germany, the routing selector 112 may analyze the phone numbers in the current pool to determine whether one or more of the phone numbers is associated with Germany. Illustratively, the analysis may be similar to the analysis described above with respect to the destination device phone number (e.g., the routing selector 112 may search for a phone number that begins with the first two digits "49"). As another example, the country or other geographic region for the individual phone numbers in the current pool may be tagged or otherwise predetermined as being associated with particular countries or other geographic regions (e.g., the phone numbers may be stored in the pool data store 114 in connection with data indicating their country or geographic region). Such tagging may be used in cases where a country or geographic region for a phone number in the current pool cannot be derived from an analysis of the digits in the phone number (e.g., when the phone number is a "short code" number having 5 or 6 digits, also known as a Common Short Code or "CSC" number).

In some embodiments, if there is no phone number associated with the same country as the destination device phone number, then the routing selector 112 may determine whether the list of phone numbers in the current pool includes a phone number that is close geographically to the country associated with the destination device phone number. For example, the routing selector may determine whether there is a phone number associated with the same "zone" as the destination device phone number. As another example, the routing selector may determine whether there is a phone number associated with a country that is within a threshold geographic distance of the country associated with the destination device phone number. As a further example, the routing selector may determine the phone number associated with the geographic region that is geographically closest to the geographic region of the destination device phone number.

In some embodiments, there may be two or more phone numbers in the pool that are associated with the same country (or other type of geographic region) as the destination device phone number. The routing selector 112 may further analyze the phone numbers to determine whether one is associated with a geographic region that is closest geographically to the region with which the destination device phone number is associated. Alternatively, the routing selector 112 may select one phone number, from the subset of phone numbers associated with the same geographic region as the destination device phone number, using a pseudo-random selection algorithm, a round-robin selection algorithm, a load-balancing algorithm, or using some other selection method.

If the routing selector 112 does not identify a phone number at decision block 310, then the process 300 can proceed to block 312. Otherwise, the process 300 can proceed to block 314.

At block 312, if the routing selector 112 has not identified a phone number at decision block 310, then the routing selector 112 can select a default number for use in sending the phone-based communication. In some embodiments, the identified pool of routing data for the current request may be associated with one or more default phone numbers. In some embodiments, the originating device 102 may be associated with one or more default phone numbers. In some embodiments, the dynamic communication management system 100 may be associated with one or more default phone numbers.

At block 314, the communication provider 110 can transmit the phone-based communication to the destination device 106 using the phone number identified above.

At decision block 316, the communication provider 110 can determine whether there are additional phone-based communications to be transmitted. If so, the process 300 can return to block 308. Otherwise, the process 300 may terminate at block 318.

Figure 3B:
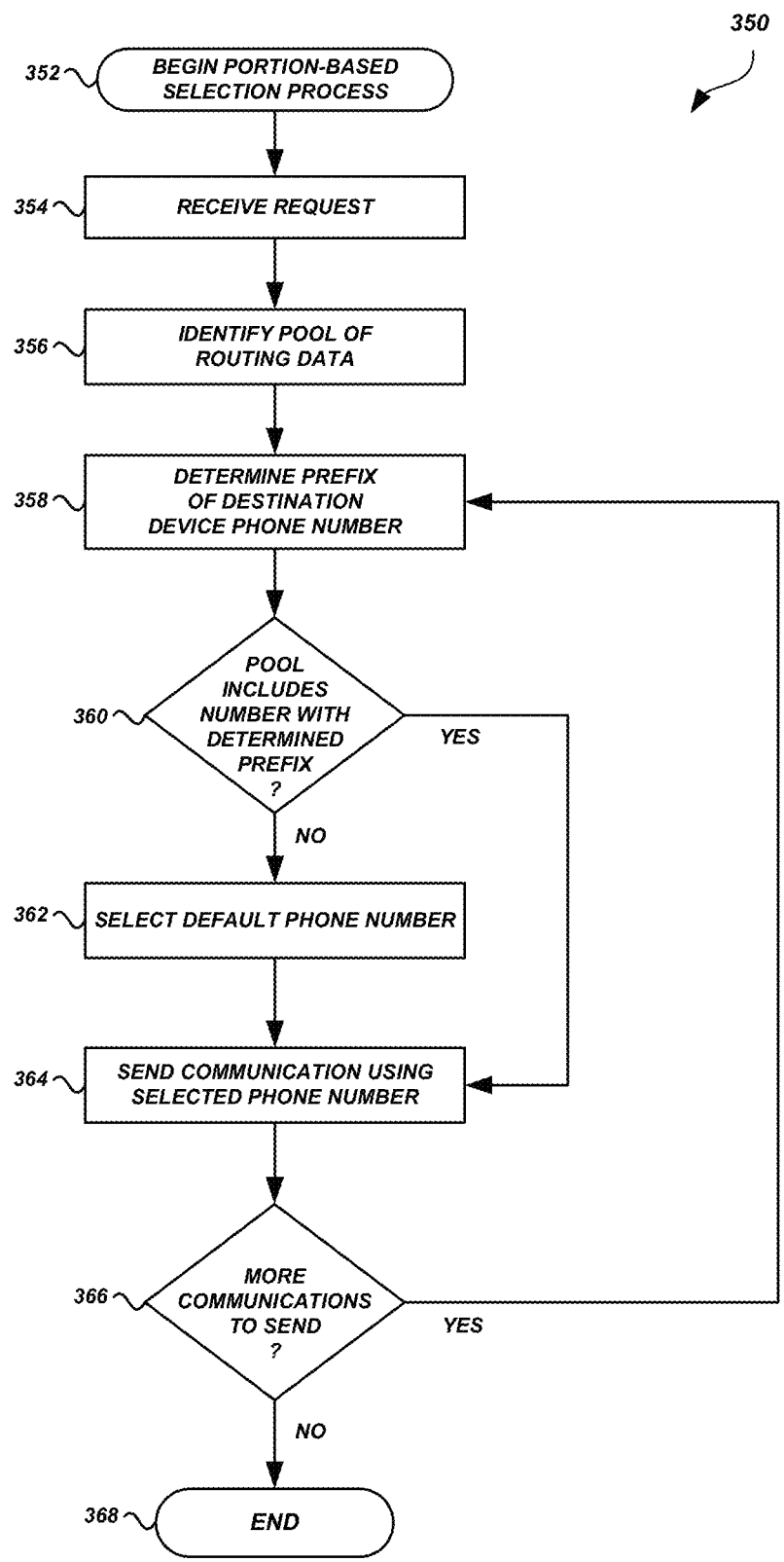
FIG. 3B is a flow diagram of another illustrative process for managing exchange of messages according to some embodiments.

FIG. 3B is a flow diagram of an illustrative process 350 that may be executed by a dynamic communication management system 100 to dynamically determine routing data based on a prefix of a phone number of a destination device 106.

The process 350 shown in FIG. 3B begins at block 352. When the process 350 is initiated, a set of executable program instructions stored on one or more non-transitory computer-readable media (e.g., hard drive, flash memory, removable media, etc.) may be loaded into memory (e.g., random access memory or "RAM") of a computing device of the dynamic communication management system 100, such as the computing device 500 shown in FIG. 5 and described in greater detail below. The executable instructions may then be executed by a hardware-based computer processor (e.g., a central processing unit or "CPU") of the computing device. In some embodiments, the process 350 or portions thereof may be implemented on multiple processors, serially or in parallel.

At block 354, the communication provider 110 or some other component or device of the dynamic communication management system 100 can receive a request to provide one or more phone-based communications to one or more destination devices 106. The request may be the same or similar to the request described above with respect to process 300, or the request may be different.

At block 356, the communication provider 110 or some other component or device of the dynamic communication management system 100 can identify the pool of routing data to be used in sending the requested phone-based communication.

At block 358, the routing selector 112 can determine the prefix (or other portion) of a phone number of a destination device 106 to which the phone-based communication is to be sent. In some embodiments, the routing selector 112 can determine the prefix based on an analysis of the phone number of the destination device 106. For example, the destination device phone number may be in the format NPA-NXX-XXXX, where "NPA" represents a particular numbering plan area code, "NXX" represents a particular central office exchange code, and "XXXX" represents a multi-digit number in which any of the digits may be the same or different than any or all of the other digits in the multi-digit number. The routing selector 112 can identify the NPA portion of the destination device phone number, the combination of the NPA and NXX portions, or some other portion.

At decision block 360, the routing selector 112 can determine whether the list of phone numbers in the current pool includes a phone number with the same prefix (or other portion) as the destination device phone number. For example, if the NPA portion of the destination device phone number is "310," the routing selector 112 may analyze the phone numbers in the current pool to determine whether one or more of the phone numbers has an NPA portion that is "310." Illustratively, the analysis may be similar to the analysis described above with respect to the destination device phone number (e.g., the routing selector 112 may search for a phone number that begins with the first three digits "310"). In some embodiments, there may be two or more phone numbers in the pool that are associated with the same prefix (or other portion) as the destination device phone number. The routing selector 112 may select one phone number, from the subset of phone numbers associated with the same prefix as the destination device phone number, using a pseudo-random selection algorithm, a round-robin selection algorithm, a load-balancing algorithm, or using some other selection method.

If the routing selector 112 does not identify a phone number at decision block 360, then the process 350 can proceed to block 362. Otherwise, the process 350 can proceed to block 364.

At block 362, if the routing selector 112 has not identified a phone number at decision block 360, then the routing selector 112 can select a default number for use in sending the phone-based communication.

At block 364, the communication provider 110 can transmit the phone-based communication to the destination device 106 using the phone number identified above.

At decision block 366, the communication provider 110 can determine whether there are additional phone-based communications to be transmitted. If so, the process 350 can return to block 358. Otherwise, the process 350 may terminate at block 368.

Example Return Routing

Figure 4:
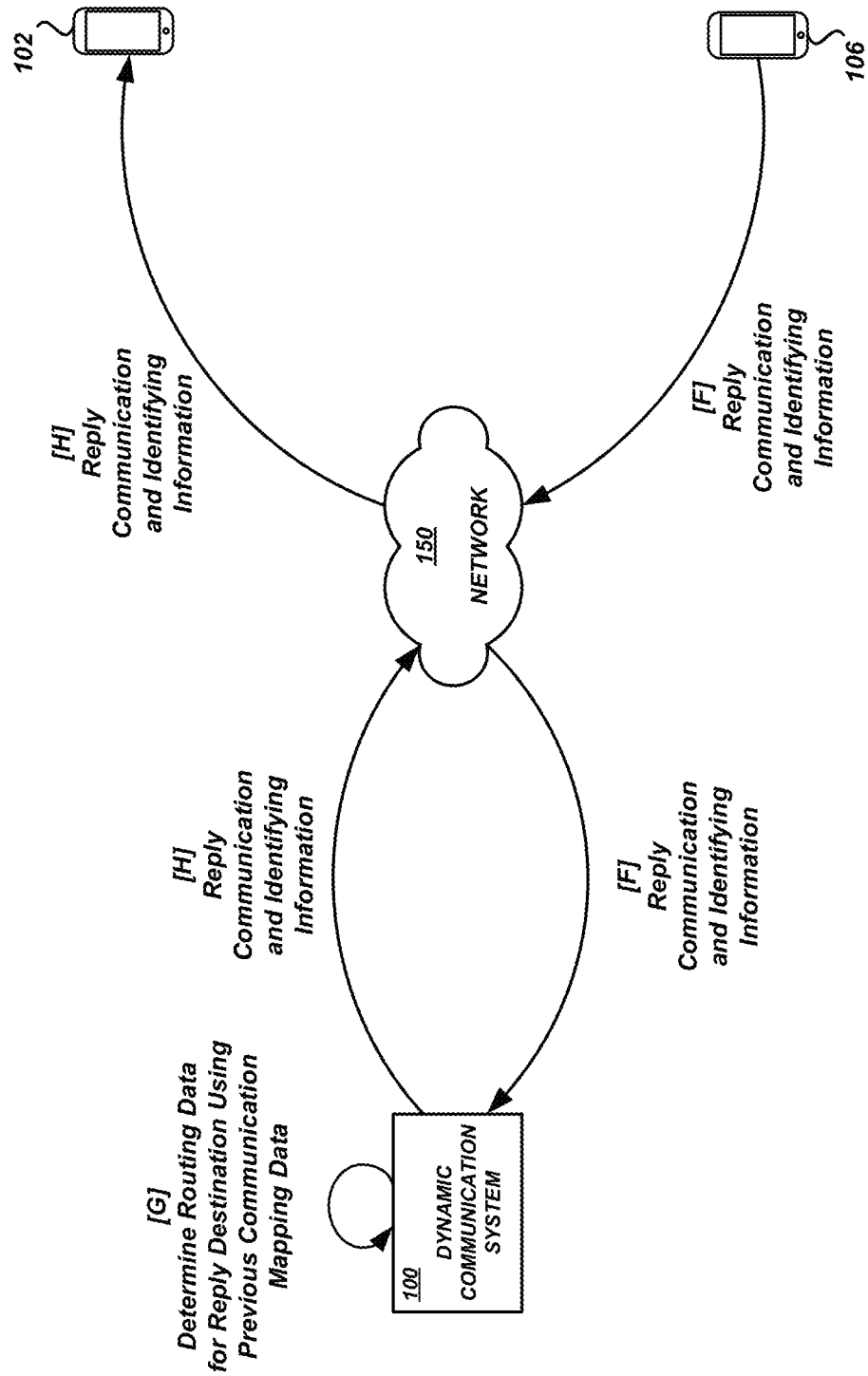
FIG. 4 is a block diagram of various data flows and interactions between a dynamic communication management system, an originating device, a gateway provider, and a destination device during a reply message according to some embodiments.

FIG. 4 shows example data flows and interactions between the dynamic communication management system 100, originating device 102, destination device 106, and network 150 in connection with the transmission of a reply to a phone-based communication. For example, the reply may be a phone-based communication sent by the destination device 106 in response to previous phone-based communication sent by the communication management system 100 on behalf of the originating device 102 (e.g., as shown in FIG. 2). In this example, the device initiating transmission of the reply communication is the destination device 106 because the destination device 106 is replying to the previous phone-based communication. The device that ultimately receives the phone-based reply communication in this example is the originating device 102 because the previous phone-based communication was sent on behalf of the originating device 102 to the destination device 106. In some embodiments, a different device may receive the phone-based reply communication. For example, there may be a phone number and/or separate device designated to receive replies to phone-based communications such as the one sent to the destination device 106 and to which the destination device 106 is replying.

At [F], the destination device 106 can initiate transmission of a reply communication. The reply communication may be a phone-based communication, such as a text message (e.g., an SMS message). The reply communication may be addressed to a phone number that is extracted or otherwise determined from the identifying information previously received in connection with a phone-based communication. In this example, the identifying information that was associated with the previous phone-based communication includes routing data that is associated with the dynamic communication management system 100. The routing data (e.g., phone number) is associated with the dynamic communication management system 100, rather than the originating device 102, because the dynamic communication management system 100 dynamically selected the routing data when sending the previous phone-based communication to the destination device 106 on behalf of the originating device 102.

At [G], the dynamic communication management system 100 can determine routing data for the intended recipient of the reply communication. The dynamic communication management system 100 may use a mapping of originating-devices-to-destination-devices for prior communications, or dynamically-determined-phone-numbers-to-destination-phone-numbers for prior communications, or some combination thereof. For example, the messages data store 116 may store information regarding the communications that have been sent to destination devices by the dynamic communication management system 100 on behalf of originating devices, such as the phone-based communication shown in FIG. 2. The messages data store 116 may include information that maps, for each destination device 106, the originating device 102 that originated transmission of the most recent phone-based communication to the destination device 106 (or originating devices for the n most recent phone-based communications sent to the destination device 106, or some other subset of phone-based communications, or all phone-based communications, etc.). In some embodiments, the messages data store 116 may include information that maps a reply phone number and/or device for each dynamically-determined phone number used to send phone-based communications to destination devices, or for each combination of destination phone number and dynamically-determined phone number used to send a phone-based communication to the originating device. In this way, the dynamic communication management system 100 can facilitate replies to different messages sent to the same device depending upon which dynamically-determined phone number was used to send the particular phone-based communication to the destination device and to which the destination device has sent a reply.

The dynamic communication management system 100 can analyze the mapping data using the identifying information received in connection with the reply communication. Illustratively, the identifying information may identify the phone number of the destination device 106 from which the reply is received by the dynamic communication management system 100. The dynamic communication management system 100 can select the mapping information that indicates the phone number of the destination device 106 as being that of a recipient of a previously-sent phone-based communication. The originating device 102 (or routing data therefor, such as the phone number, or a substitute device or phone number for replies) for that previously-sent phone-based communication can be identified by the mapping information.

In some embodiments, the routing data for reply communications may be different than the routing data for the originating device 102. For example, an entity may wish to have all replies sent to a particular device (or sent using particular routing data), and that device (or routing data) may be different than the originating device 102. In some embodiments, there may not be a need for information that maps originating-devices-to-destination-devices for prior communications. For example, the routing data used by the dynamic communication management system 100 to send phone-based communications on behalf of a particular originating device 102 may be uniquely associated with the originating device 102 (e.g., a phone number is not used to send communications on behalf of any other originating device 102 or entity). In these embodiments, the dynamic communication management system 100 can route the reply communication to the appropriate originating device 102 using mapping information that maps dynamically-determined routing data (e.g., as determined in FIG. 2) to specific originating devices 102 or to other devices designated to receive replies.

At [H], the communication provider 110 or some other module or component of the dynamic communication management system 100 can send the phone-based reply communication to the originating device 102 using the determined routing data. The phone-based reply communication may be sent in connection with identifying information that identifies the destination device 106 (e.g., caller ID information for the destination device 106). In some embodiments, the identifying information may identify the dynamic communication management system 100.

Example Computing Device

Figure 5:
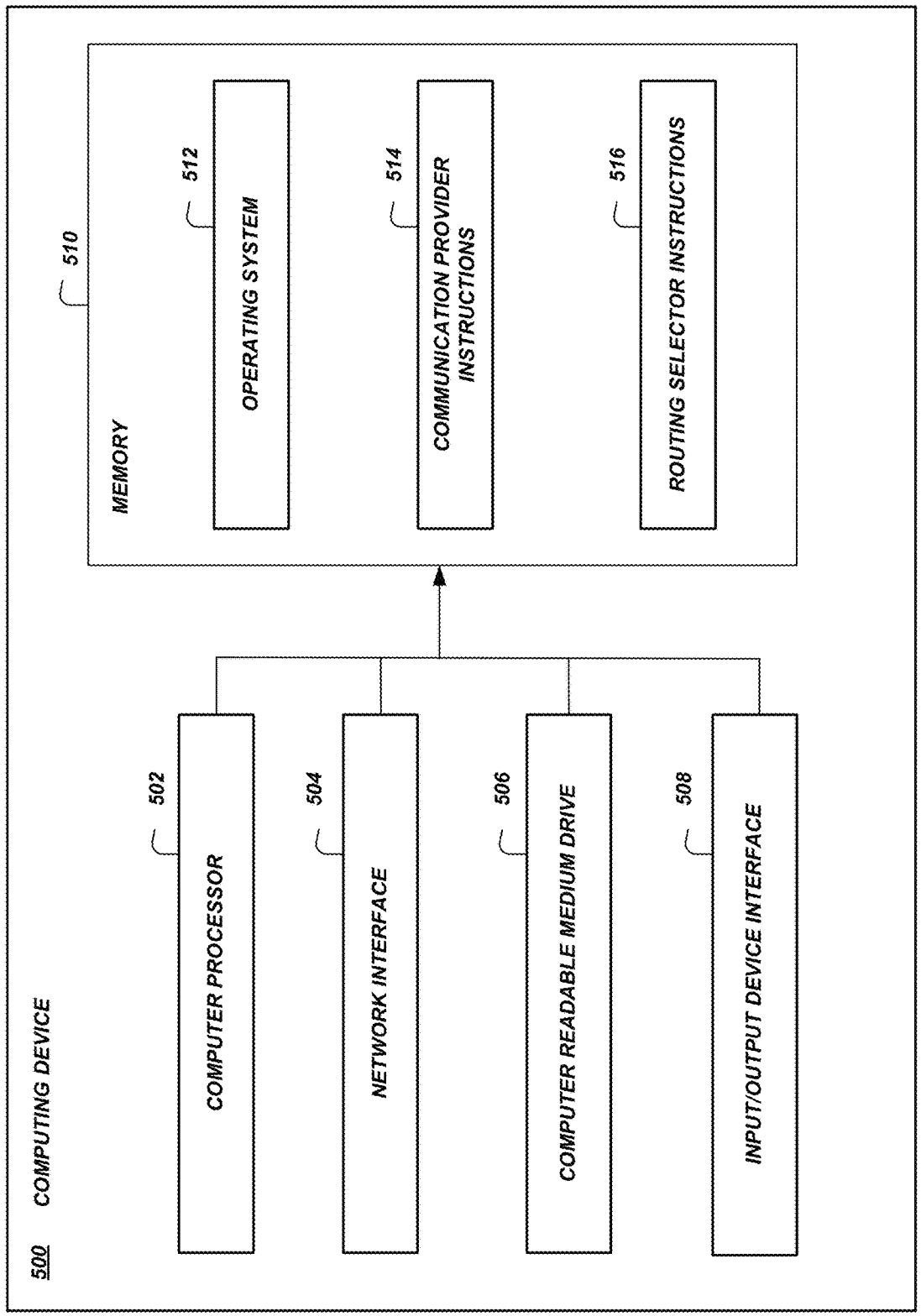
FIG. 5 is a block diagram illustrating components of a computing device configured to execute processes for dynamic communication management according to some embodiments.

FIG. 5 illustrates the various components of an example computing device 500 configured to implement some or all of the functionality of the dynamic communication management system 100. In some embodiments, as shown, the computing device 500 may include: one or more computer processors 502, such as physical central processing units ("CPUs"); one or more network interfaces 504, such as a network interface cards ("NICs"); one or more computer readable medium drives 506, such as a high density disks ("HDDs"), solid state drives ("SDDs"), flash drives, and/or other persistent non-transitory computer-readable media; an input/output device interface 508, such as an IO interface in communication with one or more microphones; and one or more computer readable memories 510, such as random access memory ("RAM") and/or other volatile non-transitory computer-readable media.

The computer readable memory 510 may include computer program instructions that one or more computer processors 502 execute in order to implement one or more embodiments. The computer readable memory 510 can store an operating system 512 that provides computer program instructions for use by the computer processor(s) 502 in the general administration and operation of the computing device 500. In some embodiments, the computer readable memory 510 can further include computer program instructions and other information for implementing aspects of the present disclosure. For example, in one embodiment, the computer-readable memory 510 may include communication provider instructions 514 for implementing features of the communication provider 110, and/or routing selector instructions 516 for implementing features of the routing selector 112.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    as implemented by a computing system comprising one or more computer processors configured to execute specific instructions,
        receiving a request to transmit a phone-based communication to a destination device, wherein the destination device is associated with a first phone number, wherein the request comprises a selection method identifier, and wherein the selection method identifier identifies a selection method of a plurality of selection methods available to be used to select routing data;
        identifying a pool of routing data associated with the request, wherein the pool of routing data comprises a plurality of phone numbers;
        determining, based at least partly on the selection method identifier, the selection method from the plurality of selection methods available to be used to select routing data;
        analyzing the first phone number to determine a property of the first phone number;
        determining that the plurality of phone numbers does not include a phone number associated with the property of the first phone number;
        determining, for individual phone numbers of the plurality of phone numbers, corresponding geographic regions of a plurality of geographic regions;
        selecting a second phone number from the plurality of phone numbers based at least partly on a geographic region associated with the second phone number being geographically closest, out of the plurality of geographic regions, to a geographic region associated with the first phone number; and
        sending the phone-based communication to the destination device using the second phone number, wherein sending the phone-based communication using the second phone number causes identifying information, based at least partly on the second phone number, to be sent to the destination device in connection with the phone-based communication.

2. The computer-implemented method of claim 1, wherein analyzing the first phone number to determine the property of the first phone number comprises determining the geographic region associated with the first phone number.

3. The computer-implemented method of claim 1, wherein analyzing the first phone number to determine the property of the first phone number comprises determining a prefix of the first phone number.

4. The computer-implemented method of claim 1, wherein sending the phone-based communication comprises sending one of: a text message, a multimedia message, or a voice-based message.

5. The computer-implemented method of claim 1, further comprising:
    storing mapping information that associates the second phone number with a third phone number of an originating device from which the request to transmit the phone-based communication was received;
    receiving a second phone-based communication from the destination device, wherein the second phone-based communication is addressed to the second phone number; and
    sending the second phone-based communication to the originating device based at least partly on the mapping information.

6. The computer-implemented method of claim 1, further comprising:
    storing mapping information based at least partly on the request to transmit the phone-based communication to the destination device, wherein the mapping information associates a reply phone number with a combination of the first phone number and the second phone number;
    receiving a second phone-based communication from the destination device, wherein the second phone-based communication is addressed from the first phone number and to the second phone number; and
    sending the second phone-based communication to a device using the reply phone number based at least partly on the mapping information.

7. The computer-implemented method of claim 6, further comprising generating the mapping information, wherein the request to transmit the phone-based communication is received from an originating device associated with an originating phone number, and wherein the reply phone number is different than the originating phone number.

8. The computer-implemented method of claim 1, further comprising receiving, from an originating device, communication scheduling information representing a plurality of phone-based communications to be sent using the pool of routing data, wherein the plurality of phone-based communications comprises the phone-based communication.

9. The computer-implemented method of claim 1 further comprising:
    receiving a second request to transmit a second phone-based communication to a second destination device, wherein the second request comprises a second selection method identifier identifying a different selection method than the selection method identifier;
    identifying a second pool of routing data associated with the second request, wherein the second pool of routing data comprises a second plurality of phone numbers;
    selecting a third phone number from the second plurality of phone numbers based at least partly on the second selection method; and
    sending the second phone-based communication to the second destination device using the third phone number.

10. The computer-implemented method of claim 1, wherein selecting the selection method from the plurality of selection methods comprises selecting one of: a first selection method in which a phone number of the plurality of phone numbers is to be selected based on the geographic region associated with the first phone number, a second selection method in which a phone number of the plurality of phone numbers is to be selected based on a portion of the first phone number, a third selection method in which a phone number of the plurality of phone numbers is to be selected based on a pseudo-random selection algorithm, a fourth selection method in which a phone number of the plurality of phone numbers is to be selected based on a round robin selection algorithm, or a fifth selection method in which a phone number of the plurality of phone numbers is to be selected based on a load balancing algorithm.

11. A system comprising:
non-transitory computer memory storing executable instructions; and
one or more hardware processors in communication with the non-transitory computer memory and configure by the executable instructions to at least:
receive a request to transmit a phone-based communication to a destination device, wherein the destination device is associated with a first phone number, wherein the request comprises a selection method identifier, and wherein the selection method identifier identifies a selection method of a plurality of selection methods available to be used to select routing data;
identify a pool of routing data associated with the request, wherein the pool of routing data comprises a plurality of phone numbers;
determine, based at least partly on the selection method identifier, the selection method from the plurality of selection methods available to be used to select routing data;
analyze the first phone number to determine a property of the first phone number;
determine that the plurality of phone numbers does not include a phone number associated with the property of the first phone number;
determine, for individual phone numbers of the plurality of phone numbers, corresponding geographic regions of a plurality of geographic regions;
select a second phone number from the plurality of phone numbers based at least partly on a geographic region associated with the second phone number being geographically closest, out of the plurality of geographic regions, to a geographic region associated with the first phone number; and
send the phone-based communication to the destination device using the second phone number, wherein sending the phone-based communication using the second phone number causes identifying information, based at least partly on the second phone number, to be sent to the destination device in connection with the phone-based communication.

12. The system of claim 11, wherein the executable instructions to analyze the first phone number to determine the property of the first phone number comprise executable instructions to determine the geographic region associated with the first phone number.

13. The system of claim 11, wherein the executable instructions to analyze the first phone number to determine the property of the first phone number comprise executable instructions to determine a prefix of the first phone number.

14. The system of claim 11, wherein the one or more processors are further configured by the executable instructions to at least:
store mapping information based at least partly on the request to transmit the phone-based communication to the destination device, wherein the mapping information associates a reply phone number with a combination of the first phone number and the second phone number;
receive a second phone-based communication from the destination device, wherein the second phone-based communication is addressed from the first phone number and to the second phone number; and
send the second phone-based communication using the reply phone number based at least partly on the mapping information.

15. The system of claim 11, wherein the one or more processors are further configured by the executable instructions to at least:
store mapping information that associates the first phone number with a third phone number, wherein a reply to the phone-based communication is to be sent using the third phone number;
receive a second phone-based communication from the destination device, wherein the second phone-based communication is addressed to the second phone number; and
send the second phone-based communication to a device based at least partly on the mapping information.

16. The system of claim 11, wherein the plurality of selection methods comprises at least one of: a first selection method in which a phone number of the plurality of phone numbers is to be selected based on the geographic region associated with the first phone number, a second selection method in which a phone number of the plurality of phone numbers is to be selected based on a portion of the first phone number, a third selection method in which a phone number of the plurality of phone numbers is to be selected based on a pseudo-random selection algorithm, a fourth selection method in which a phone number of the plurality of phone numbers is to be selected based on a round robin selection algorithm, or a fifth selection method in which a phone number of the plurality of phone numbers is to be selected based on a load balancing algorithm.

17. The system of claim 11, wherein the plurality of selection methods comprises:
a first selection method in which a phone number of the plurality of phone numbers is to be selected based on the geographic region associated with the first phone number; and
a second selection method in which a phone number of the plurality of phone numbers is to be selected based on a portion of the first phone number.

18. The system of claim 11, wherein two or more phone numbers of the plurality of phone numbers satisfy the selection method, and wherein the second phone number is selected from the plurality of phone numbers based further on one of:
a first selection method in which a phone number of the two or more phone numbers is to be selected based on a pseudo-random selection algorithm;
a second selection method in which a phone number of the two or more phone numbers is to be selected based on a round robin selection algorithm; or
a third selection method in which a phone number of the two or more phone numbers is to be selected based on a load balancing algorithm.

19. The system of claim 11, wherein the selection method comprises a pseudo-random selection method or a load-balancing selection method.

20. The system of claim 11, wherein the one or more processors are further configured by the executable instructions to at least:
- receive a second request to transmit a second phone-based communication to a second destination device, wherein the second request comprises a second selection method identifier identifying a second selection method different from the selection method;
- identify a second pool of routing data associated with the second request, wherein the second pool of routing data comprises a second plurality of phone numbers;
- select a third phone number from the second plurality of phone numbers based at least partly on the second selection method; and
- send the second phone-based communication to the second destination device using the third phone number.

* * * * *